United States Patent Office 2,959,629
Patented Nov. 8, 1960

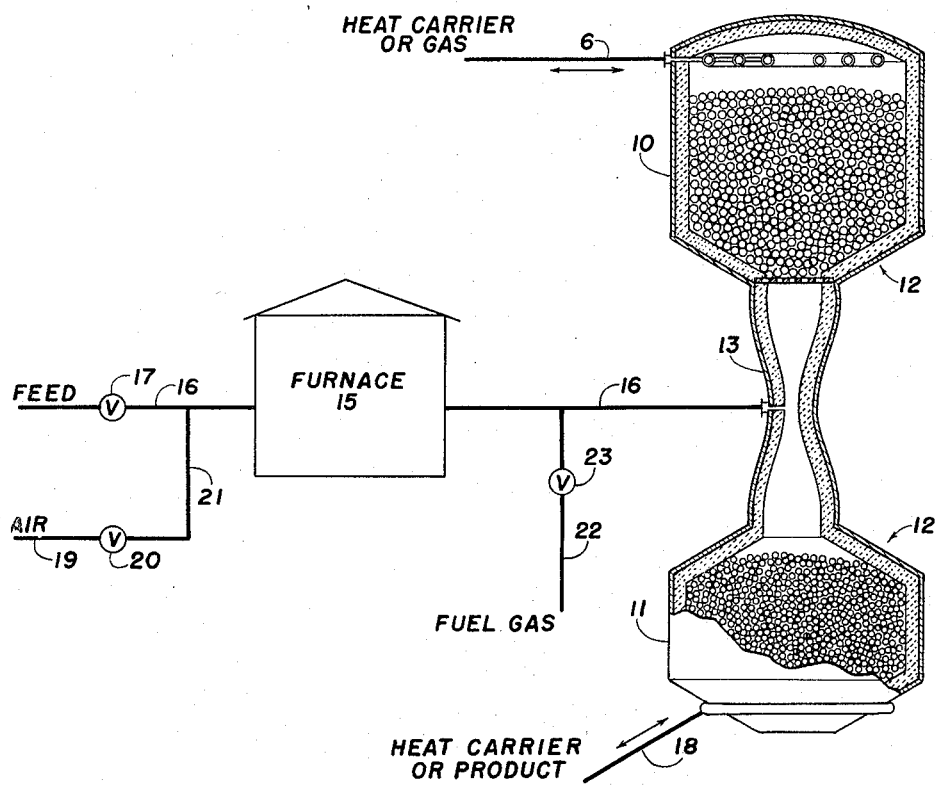
INVENTOR.
HAROLD A. LINDAHL
ATTORNEY

2,959,629

FIXED BED, PYROLYTIC, HYDROCARBON CONVERSION PROCESS EMPLOYING A GRANULAR, HEAT-TRANSFER MEDIUM

Harold A. Lindahl, Elmhurst, Ill., assignor to The Pure Oil Company, Chicago, Ill., a corporation of Ohio Filed Nov. 19, 1956, Ser. No. 623,237

6 Claims. (Cl. 260—679)

This invention relates to a method and apparatus for carrying out high temperature reactions. It is more specifically concerned with the processing of hydrocarbon feed stocks to produce acetylene.

As expedients for producing high temperatures to facilitate the processing of feed stocks in non-catalytic pyrolysis methods, there are available several means. Where high conversion-level temperatures are required, such as in the production of acetylene, it has been found that regenerative refractory pyrolysis methods are less sensitive to carbon formation, permit shorter residence time and higher temperatures, and achieve correspondingly higher conversions. In regenerative refractory systems the processing zones are often filled with a mass of a refractory solid material, generally in the form of granular aggregate, which functions as the heat source. Because of various considerations such as heat transfer, fluidization tendencies, etc., small diameter particles of 0.5 in. to 0.125 in. in diameter are employed in such systems, contained in so-called "pebble bed heaters." This arrangement, however, gives rise to high pressure-drops through the refractory mass.

It is therefore an object of this invention to provide, in a pyrolysis system employing an aggregate mass of regenerative, refractory, heat transfer particles, an improved pressure distribution. It is another object of this invention to effect heat economies in a fixed-bed pebble heater. A further object of this invention is to provide a heat-transfer apparatus for the high temperature processing of reactant streams that does not require flow control means especially designed for high temperature service.

Figure 1 is a diagrammatic illustration of a processing scheme utilizing the pyrolysis system of this invention.

In conventional regenerative, refractory, pyrolysis methods employing pebble beds to effect heat transfer, the refractory mass disposed in the reaction section is heated by a suitable means, such as combustion of gases, and the accumulated heat is subsequently absorbed by the reactant when passed through the reaction zone. After a brief residence time in the reaction zone, the reaction effluent is transferred to a quenching zone where, upon contact with a cool mass of small-diameter, granular, refractory particles, the reaction effluent is cooled below the temperature at which undesirable side reactions such as polymerization, coking, etc. occur.

According to this invention it has been found desirable to employ the "pebble bed" heater to heat a gaseous heat-carrier to a sufficiently high temperature to effect the conversion of selected reactant upon contact therewith. The hot, gaseous heat carrier subsequently serves as a diluent for increasing the efficiency of conversion. The reactant feed stock is heated to an elevated temperature somewhat below the range of conversion temperatures and is then brought into direct heat-exchange contact with the hot, gaseous, heat-carrier in a mixing zone. After a short residence time in the mixing zone, viz., 0.001 to 1 second, the reaction mixture is immediately transferred to a quenching zone comprising a mass of refractory, granular particles having a smaller nominal diameter than the heat-transfer particles employed in the heating zone of the pyrolysis system. In the quenching zone cooling of the reaction effluent is rapidly effected at the rate of about 1000° F. or more per minute. This requires that the temperature of the quenching zone be substantially cooler than the reaction effluent entering this zone. Depending upon the reaction, this temperature differential will be about 300–2300° F. For example, in the processing of ethane in the process of this invention, employing steam as the heat carrier gas, not only for reaction purposes but also for repositioning the hot zone in the heat carrier gas heater, the quenching zone is at a temperature of about 300° F. in order to satisfactorily effect the cooling of the 2600° F. reaction effluent.

Referring to Figure 1, it is seen that pebble beds 10 and 11 are contained in process vessel 12 which is suitably insulated, preferably internally and externally. Bed 10, which functions as a heat-carrier heating zone, can be of cylindrical, conical, or other shape, contains pebbles of relatively large diameter, and is designed to cause very little pressure drop in gases flowing through it. Bed 11, which is the quench zone, is preferably cylindrical in shape. An intermediate section comprises mixing and reaction zone 13.

In operation, a heat-carrier and diluent gas, such as steam, is introduced into the top of bed 10 through line 14, which is connected to distributor 30 to insure an even distribution of the heat carrier gas through the pebble mass. In the production of acetylene from gaseous, hydrocarbon mixtures containing ethane, bed 10 is preheated to about 3000° F. in a manner hereinafter described. The gaseous heat-carrier closely approaches the bed temperature upon passing through bed 10 and enters mixer zone 13 at about 3000° F. In mixer zone 13 this heat carrier contacts, in direct heat exchange, the preheated hydrocarbon vapors entering through furnace 15 and line 16 and the streams are rapidly mixed.

The hydrocarbon feed gas to be pyrolyzed is preheated to a temperature somewhat below that at which decomposition begins, and the temperature of bed 10 (and consequently that of the hot, heat-carrier) is chosen so that a temperature sufficiently high to cause conversion will be attained when the two streams mix. The pyrolysis reactions take place almost immediately upon mixing and attainment of reaction temperature, and are endothermic. Therefore, the reaction mixture cools somewhat (to about 2600° F.) before entering bed 11. Upon entering bed 11, which is initially at about 300° F., the reaction mixture is rapidly quenched, stopping further reaction.

As flows continue, a cool zone at the temperature of the incoming heat-carrier gas develops at the top of bed 10 and gradually lengthens downward until the entire bed has been cooled to the heat-carrier gas inlet temperature. When this has occurred, the reaction period must be terminated in order that the hot zone can be moved back from bed 11 to bed 10.

Meanwhile, a hot zone at the temperature of the reaction mixture entering the top of bed 11 develops at the top of bed 11 and gradually lengthens downward in the bed. This bed must be of such a length that an adequate quench zone remains at the bottom of the bed when the hot zone of bed 10 has been completely displaced.

When the bed 10 hot zone has been completely displaced, hydrocarbon flow is stopped by closing valve 17, diluent entry at line 14 is stopped, and steam is admitted at line 18. This stream passes upward through beds 10 and 11 and moves the hot zone (now at 2600° F.) to bed 10. Since this hot zone has increased in volume during the reaction period, it is now larger than bed 10, and when it has been entirely displaced from bed 11, some steam at 2600° F. will have issued from bed 10 through line 14. The heat in this steam is recovered by any suitable means, such as a heat exchanger or condenser (not shown). When bed 11 has cooled and bed 10 is again hot (now at 2600° F.), the initial flows of diluent at line 14 and hydrocarbon at line 16 are re-established and a second reaction period ensues. This cyclic operation is continued until the hot zone temperature has decreased to an ineffective level, at which time reheating is required.

In a specific example of this invention, ethane is thermally pyrolyzed in the pebble bed reactor diagrammatically shown in Figure 1. Bed 10 is cylindrical in shape, having a top diameter of ten feet, and an axial length of five feet. The bottom of the heating zone which is frustoconical in shape, is connected to Venturi-type mixing and reacting zone 13. The Venturi section is substantially symmetrical, having inlet and outlet sections about 1 foot in diameter. The walls of these sections gradually converge inwardly forming the throat of the Venturi at which point the feed gases are introduced. The throat diameter is about 8 inches in diameter. The entire length of the reaction and mixing zone is 2 feet. Bed 11 is cylindrical and has an inside diameter of twelve feet and an axial length of five and one-half feet. The volume of bed 10 is 400 cubic feet and that of bed 11 is 620 cubic feet. Bed 10 is packed with one-inch-diameter spherical alumina pebbles and bed 11 with one-fourth-inch alumina pebbles. The interior surfaces of the metal shells containing both beds are covered with a bonded, fused alumina.

At the start of the reaction period, bed 10 is uniformly heated to 3000° F. and bed 11 is at 300° F. To begin the reaction period, 3390 lbs. per minute of steam at 300° F. are introduced through line 14 to the top of bed 10. The steam closely approaches the bed temperature upon passing through bed 10 and enters Venturi mixer zone 13 at about 3000° F. Ethane, preheated to 1500° F. in furnace 15, is introduced to Venturi mixer zone 13 through line 16 at the rate of 14,240 standard cubic feet per minute. The mixing of the ethane and steam in the Venturi results in a gaseous mixture of five moles of steam per mole of ethane at 2500° F. The ethane preheat temperature of 1500° F. is somewhat below the temperature at which thermal decomposition begins, but the pyrolysis reactions take place almost immediately upon mixing with the hot diluent steam in mixer zone 13. The endothermic nature of the reaction lowers the temperature of the reaction mixture before it enters bed 11. Upon entering bed 11, which is initially at 300° F., the reaction mixture is rapidly quenched, thereby stopping further reaction.

This flow of ethane and steam is maintained for 16.3 minutes. The quenched gases discharge from bed 11 at about 300° F. through line 18 and flow to a conventional recovery process. With this reaction period, the reaction products from the recovery process contain 70 mole percent acetylene and 20 mole percent ethylene. During the reaction period, a cold zone at about 300° F. develops at the top of bed 10 and gradually lengthens downward until the entire bed has cooled to the diluent inlet temperature of 300° F. Meanwhile, a hot zone (at the temperature of the reaction mixture entering bed 11) develops at the top of bed 11 and gradually lengthens downward in the bed. After the stated time duration, the reaction period is terminated in order that the hot zone can be moved back from bed 11 to bed 10.

The pressure drop over the complete reactor is 20 p.s.i. This pressure drop is sixty percent less than the pressure drop in prior processes which are designed for conditions of concurrent flow of diluent steam and feed gas through bed 10 packed with one-fourth-inch diameter pebbles. Thus it is demonstrated that the reactor design and operation as described above and shown in the diagram effects a considerable savings in compression and pumping costs. Furthermore, the smaller pressure drop across the reactor permits lower pressures in the reactor beds. This is advantageous because low pressures are more favorable for the desired pyrolysis reactions. Also, the high velocities through the venturi throat and immediately thereafter, where the major portion of the reactions take place, reduce the pressure in this reaction zone to 10.2 p.s.i.a. This low pressure is even more favorable for the desired reactions.

After the reaction period, bed 10 is at about 300° F., and the hot zone extends from venturi mixer zone 13 to a length of 4.5 feet in bed 11. The remaining one foot of bed 11 is the residual quench zone at 300° F. To reposition the hot zone in bed 10, 1690 pounds of steam per minute at 300° F. is admitted at line 18 for 29 minutes. This steam passes upward through beds 11 and 10 and moves the hot zone to bed 10. During the last 7.7 minutes of this operation, the steam issuing from bed 10 through line 14 is at the hot zone temperaure because the hot zone has increased in volume during the previous reaction period. The sensible heat in this steam is recovered by any suitable means, such as a heat exchanger or condenser (not shown on the diagram).

After the hot zone repositioning step is completed, the initial flows of diluent steam at line 14 and ethane at line 16 are again established and a second reaction period begins. This cyclic operation of alternating reaction and hot zone repositioning steps is continued for three reaction periods of equal time durations of 16.3 minutes, after which the hot zone temperature has decreased to 1550° F. At this time, reheating of bed 10 is required. The reaction products from the recovery system during the second reaction period contain 75 mole percent ethylene and 15 mole percent acetylene, and those during the third reaction period contain 90 mole percent ethylene.

To reheat bed 10 to the desired initial temperature of 3000° F., valve 17 is again closed to stop ethane flow, diluent steam flow at line 14 is stopped, and steam is admitted at line 18 at a rate of 1690 pounds per minute and a temperature of 300° F. After eight minutes of this steam flow, the volume of the spent hot zone to be removed from bed 10 has moved from bed 11 to bed 10. At this time, 30,400 standard cubic feet per minute of air at 60° F. is introduced at line 19, valve 20, and line 21, and 2870 standard cubic feet of fuel gas at 60° F. is introduced at line 22, valve 23, and line 16. The air passes through furnace 15 and line 16 and mixes with the fuel gas for combustion in mixer zone 13 which contains the necessary burners. The air is preheated to 1700° F. in furnace 15 and the resulting temperature of the mixture of combustion products and steam in mixer-burner 13 is 3000° F. These steam, air, and fuel gas flows are continued for 22 minutes, after which time all of bed 11 is at 300° F. and all of bed 10 is at 3000° F. At this time, another series of reaction periods is begun.

It is clearly seen from this example that another advantage of the process is the high efficiency of heat recovery. The only heat not directly recovered within the pebble beds is that contained in the small increment of hot zone that is displaced from the top of bed 10 during the hot zone repositioning steps and the reheating step. But even this heat is almost completely recovered indirectly by the accessory heat exchange equipment. It is noteworthy, too, that none of the valves auxiliary to the pebble bed system are subjected to temperatures greater than a few hundred degrees, in contrast to previous processes where the valves are subjected to reaction temperatures with consequent serious difficulties.

Although the foregoing illustrative embodiment is directed to the production of acetylene from ethane, the process and apparatus of this invention can be employed in carrying out chemical reactions which require high temperatures to initiate and promote the decomposition of hydrocarbon feed stocks, or interaction between chemical reactants. The feed stocks which are processed using pyrolytic methods can consist of either gaseous or liquid feed stocks. Reaction systems where feed stocks are subjected to pyrolysis include but are not limited to the production of ethylene and/or acetylene from refinery waste gases, or the cracking of propane and ethane as well as heavier, normally liquid hydrocarbon mixtures such as petroleum naphthas and gas oils; the preparation of dialkyl nitriles from cyanogen and olefins; the thermal treatment of light petroleum distillates such as thermal or catalytically cracked gasolines to produce low end-point gasolines having improved performance characteristics; the synthesis of acrylonitrile from hydrogen cyanide and ethylene, or cyanogen and ethylene; manufacture of cyanogen from hydrogen cyanide and nitrogen dioxide; and the production of hydrogen cyanide from saturated hydrocarbons and nitric oxide. The reactants which are employed are preheated to a temperature at which substantially no decomposition occur prior to introduction into the reaction and mixing zone.

Accordingly, process conditions will vary depending upon the type of reaction being conducted. In general, processes can be carried out with this invention at temperatures from 1000° F. to 4000° F. For operating at temperatures up to about 3100° F., alumina refractories can be employed as the lining in various parts of the vessel exposed to the high temperatures. If higher temperatures are to be employed, linings such as magnesia should be used. If desired, the process can be operated at below or above atmospheric pressures, as well as at atmospheric pressure.

Also dependent upon the type of reaction are the sizes of the heating zone and the quenching zone. It is the purpose of the heating zone to heat the gaseous heat carrier to a temperature which when admixed with the incoming feed, will provide a reaction mixture at the desired conversion level temperature. Accordingly if the reaction is endothermic in nature, as in the illustrative embodiment, the heating zone will have to be larger than quenching zone in order to provide the necessary heat for the reaction. On the other hand, if the reaction is exothermic it will be necessary for the quenching zone to be larger than the heating zone in order to remove the added heat from the reaction. Accordingly, the system will be designed to provide a suitable heat balance without employing outsized heating or quenching zones. It may be necessary, however, if flexibility in operation is desired, to provide a system which will operate under exothermic or endothermic conditions. In this instance it is apparent that design economies will have to be sacrificed in order to attain the required flexibility.

The flow rates for down-flow operation of the process are limited by factors such as pressure drop over the pebble beds and reaction temperature resulting from the mixing of the fluids. The flow rate for up-flow operation is limited to the fluidization velocities of the particular pebble beds. The selection of the granular heat transfer particles will depend upon the functional requirement of the heater zone and the quenching zone. In the former, instantaneous heat transfer between pebbles and fluid is not required for the efficient operation of the process; therefore, relatively larger size pebbles may be employed. The use of large pebbles in this bed results in a decreased pressure drop across the bed as compared to the pressure drop inherent in prior processes. Accordingly, particles having a nominal diameter of 1 in. to 1½ in. are employed. In the latter case, rapid quenching is the criterion and pebble sizes of ⅛ in. to ¼ in. diameter are utilized. To effect an expeditious balance between minimum pressure drop in the heating zone and rapid quenching in the quenching zone, the ratio of particle size of the heat-transfer means in the respective zones should preferably be about 4-10 to 1, however, other ratios can be used depending upon the specific apparatus design employed.

Another factor in selecting the size of the heat-transfer particles is the prevention of partial fluidization of the aggregate mass during the up-flow of gases through the quenching zone and heating zone. The heat-transfer particles preferably are prepared from alumina; however, other refractory materials such as mullite, kaolin, quartz, silica, sandstone, dolomite, etc., can be used.

Because of the convenience in employing steam as the heat-carrier means, this medium is preferred. However, hydrogen is produced in a number of processes for which my invention may be used and can be easily separated from the reactor effluent gases, employing conventional gas separation techniques, for use as an excellent heat carrier and diluent. Other gaseous heat carriers that can be employed include but are not limited to nitrogen and helium. The proper heat carrier will depend upon the type of process which is being conducted. In addition, a different heat carrier than is employed in the processing cycle can be used in repositioning the hot section in the heating zone, if desired. For example, steam can be used in the processing cycle and flue gas during the reheating cycle. Other combinations are obvious. The heat carrier gases are introduced into the system either during the reheating cycle or during the processing cycle without preheating and will be used at the ambient temperature at which they are obtained. For example steam will be employed at a temperature of 300° F. in order to avoid condensation. If air is utilized it could be used at ambient atmospheric temperature. The temperature to which the heat carriers are heated will depend upon the reaction temperature used. This temperature will be high enough so that upon the admixing of the preheated reactants and heat carrier, reaction at a satisfactory conversion level will result. In general, suitable heat carriers will have the following characteristics: high heat capacity, non-reactive at elevated temperature, and easily separated from feed and reaction products. The ratio of the amount of the heat carrier to the amount of feed gas will depend upon the extent of dilution of reactants required to carry out the desired reactions. For example, in pyrolyzing ethane to manufacture acetylene, employing steam as the heat carrier, 5 to 2 moles of steam per mole of ethane can be employed.

In constructing the apparatus which is utilized in carrying out the process phase of this invention, conventional materials of construction can be used. Selection of the insulation and refractory linings as noted above will depend upon the service in which the invention is used. Because a minimum pressure drop is desirable in the heating zone, the shape of this zone is preferably such that this object is attained, but the pressure drop across this zone is primarily dependent on the size of the pebbles contained in the zone and is relatively independent of the shape of the heater. The pressure drop will be affected to a limited extent by the shape of the heater at the entrance to the Venturi mixer. To minimize frictional losses due to entrance losses at this point, a truncated cone-shaped zone is recommended. Also, the cone-shaped design is desirable from a construction standpoint because of the expansion of the pebbles and refractory lining at elevated temperatures.

The quenching zone is normally cylindrical in shape. The heat-transfer and pressure-drop characteristics are primarily dependent on the pebble size and are affected only to a limited extent by the actual shape of the zone. Although the mixing of gases is not considered to be a difficult operation, the high temperatures encountered in the mixing and reaction zone make a Venturi-type of jet mixing distinctly preferable. An inherent advantage of the Venturi mixer is the low static pressure in the reaction zone due to the high fluid velocities in the venturi throat. A low static pressure is advantageous for the pyrolysis reactions. Other expedients such as jet mixers and baffle-column mixers can also be used. In the illustrated embodiments of this invention, the heating zone was superposed on the quenching zone, but it is obvious that other designs and arrangements can be utilized employing a converse relationship for these respective zones. Other modifications within the scope of this invention will also be obvious to those skilled in the art to which this invention pertains.

In comparing the apparatus and process of this invention with previous regenerative refractory pyrolysis systems employing fixed-bed operation, several advantages become apparent. First, the use of larger granular, heat-transfer particles in the top bed for heating the heat-carrier gas reduces overall pressure drop. These larger granular, heat-transfer paticles can be used because this bed is not used for quenching, and highly efficient heat transfer from gas to pebbles is therefore not necessary, whereas previous systems have used both beds as quench zones during the reaction periods and have therefore required the use of relatively small pebbles throughout.

A second advantage obtained by this invention is the reduction in pressure drop and pumping costs because the hydrocarbons need be pumped only through the quenching zone. Still another advantage is the instantaneous mixing of hot diluent and relatively cool hydrocarbon gases, and the rapid reaction and quenching. In previous regenerative refractory pyrolysis systems employing fixed-bed reactors, the diluent and hydrocarbon gases have been in contact during the preheating within the bed, and a certain amount of undesirable side reaction has occurred, but this is eliminated, or at least greatly reduced, by the subject process wherein reaction temperatures are reached immediately upon mixing.

Another advantage lies in the improved pressure distribution inherent in the apparatus of this invention. Since the hydrocarbon feed need be charged at a pressure sufficient to overcome the pressure drop in only the bottom bed, lower reaction pressures which are more advantageous for the desired reactions are permissible. Furthermore, if a Venturi mixer is used, the high velocities at the throat and immediately thereafter, where the major portion of the reaction takes place, cause still lower pressures which are even more favorable for the occurrence of the desired reactions.

Still another advantage is the high efficiency of heat recovery in my process. The only heat that is not directly recovered within the pebble beds is that contained in the small increment of hot zone that is displaced from the top of the preheating bed during the hot zone repositioning and reheating steps. However, even this heat may be almost completely recovered by the provision of suitable heat-exchange equipment.

It is also notable that none of the valves auxiliary to my pebble-bed vessel are subjected to temperatures greater than a few hundred degrees, as opposed to previous processes which have subjected valves to reaction temperatures with consequent serious difficulties.

Thus, it is seen that a novel apparatus and process for high temperature gas conversion has been described which overcomes many of the disadvantages of previous processes of this type.

I claim:

1. A fixed bed, regenerative, refractory, pyrolytic method for the high temperature conversion of a gasiform hydrocarbon reactant at a temperature of about 1000°–4000° F., which comprises passing a gaseous heat carrier through a fixed bed, heating zone in direct heat exchange with a first, stationary, aggregate mass of refractory, heat-transfer particles preheated to an elevated temperature conducive to the conversion of said reactant, the configuration of said mass and nominal diameter of said particles being sufficient to provide minimum resistance to the flow of said heat-carrier through said heating zone, passing the heated, heat-carrier to a venturi-type mixing and reaction zone immediately adjacent said heating zone, introducing a gasiform reactant into said mixing and reaction zone at the venturi throat thereof, intimately contacting said heat-carrier and said reactant for about 0.001–1 second at a reaction temperature of about 1000°–4000° F. and a subatmospheric pressure within said mixing and reaction zone to effect the conversion of said reactant, rapidly cooling the effluent from said mixing and reaction zone to a temperature substantially below reaction temperature by contacting said effluent in a fixed bed, quenching zone disposed immediately adjacent said mixing and reaction zone with a second, stationary, aggregate mass of refractory, heat-transfer particles cooled to a temperature substantially below said reaction temperature, the diameter of said particles being smaller than the particles in said first refractory mass in the ratio of about 4–10 to 1, carrying out the aforenamed steps for a sufficient time to produce a zone of increased temperature in that portion of said quenching zone adjacent to said Venturi, and a zone of decreased temperature in that portion of said heating zone farthest removed from said Venturi, then terminating the flow of said gaseous heat-carrier and the introduction of said gasiform reactant, and passing a gasiform heat-carrier medium through said quenching zone and heating zone in reverse direction to the flow of said gaseous heat-carrier for a sufficient time and at a sufficient rate to transfer heat from said zone of increased temperature to said zone of decreased temperature and thereby restore both said last-named zones to substantially initial operating temperatures.

2. A process in accordance with claim 1 in which said reaction and mixing zone is maintained at an absolute pressure of about 10 p.s.i.a.

3. A process in accordance with claim 1 in which the reaction effluent is rapidly cooled in said quenching zone to a temperature of about 300–2200° F. below said reaction temperature.

4. A process in accordance with claim 1 in which the gasiform reactant is introduced at a temperature of about 100° to 1500° F. lower than said reaction temperature.

5. A process in accordance with claim 1 in which said heat-carrier is introduced to said reaction and mixing zone at a temperature not less than about 100° F. higher than said reaction temperature.

6. A process in accordance with claim 5, in which said heat-carrier is selected from the group consisting of steam, oxygen-free gases, hydrogen and nitrogen.

References Cited in the file of this patent

UNITED STATES PATENTS

| | | |
|---|---|---|
| 2,283,499 | Hachmuth | May 19, 1942 |
| 2,421,744 | Daniels et al. | June 10, 1947 |
| 2,520,149 | Kneeling | Aug. 29, 1950 |
| 2,535,944 | Mathy | Dec. 26, 1950 |
| 2,629,753 | Frevel et al. | Feb. 24, 1953 |
| 2,741,648 | Bills | Apr. 10, 1956 |
| 2,877,279 | Fowler et al. | Mar. 10, 1959 |